United States Patent [19]
Drish

[11] Patent Number: 5,400,996
[45] Date of Patent: Mar. 28, 1995

[54] FISHING POLE SUPPORT HOLDER AND METHODS OF CONSTRUCTING AND UTILIZING SAME

[76] Inventor: Michael Drish, 6040 Lake Bluff Dr., Tinley Park, Ill. 60477

[21] Appl. No.: 126,886

[22] Filed: Sep. 27, 1993

[51] Int. Cl.$^6$ ............................................. F16M 13/00
[52] U.S. Cl. ..................... 248/520; 248/514; 248/171
[58] Field of Search ............... 248/514, 520, 528, 530, 248/533, 529, 169, 171, 166, 435, 117.2, 81, 80, 515, 511, 538, 525; 43/54.1, 27.2

[56] References Cited

U.S. PATENT DOCUMENTS

| | | |
|---|---|---|
| 525,132 | 8/1894 | Burke . |
| 1,837,637 | 12/1931 | Walberg .................. 248/171 X |
| 1,891,163 | 12/1932 | Kabele ..................... 248/533 X |
| 2,438,388 | 3/1948 | Dolk ........................ 248/533 X |
| 2,752,115 | 6/1956 | Green ........................... 248/533 |
| 2,763,453 | 9/1956 | Palino ...................... 248/122 X |
| 2,869,814 | 1/1959 | Hurlmann ................. 248/528 X |
| 3,055,136 | 9/1962 | Scott et al. ............... 248/514 X |
| 4,086,716 | 5/1978 | Donahue .................. 248/533 X |
| 4,159,816 | 7/1979 | Miyamae ....................... 248/515 |
| 4,565,025 | 1/1986 | Behrle . |
| 4,650,146 | 3/1987 | Duke . |
| 4,854,069 | 8/1989 | Smith et al. ................. 248/538 |
| 5,131,179 | 7/1992 | McEwen .................. 43/54.1 X |

FOREIGN PATENT DOCUMENTS 822635  10/1959  United Kingdom ................ 248/520

Primary Examiner—Karen J. Chotkowski
Attorney, Agent, or Firm—Weiner, Carrier & Burt

[57] ABSTRACT

A portable fishing pole support holder. The holder includes support arms for holding the fishing pole in a variety of elevated, operable positions; legs which support the holder in a standing position; collapsing device for quick, easy, and efficient storage or transport thereof; and locking device for secure operation thereof.

15 Claims, 1 Drawing Sheet

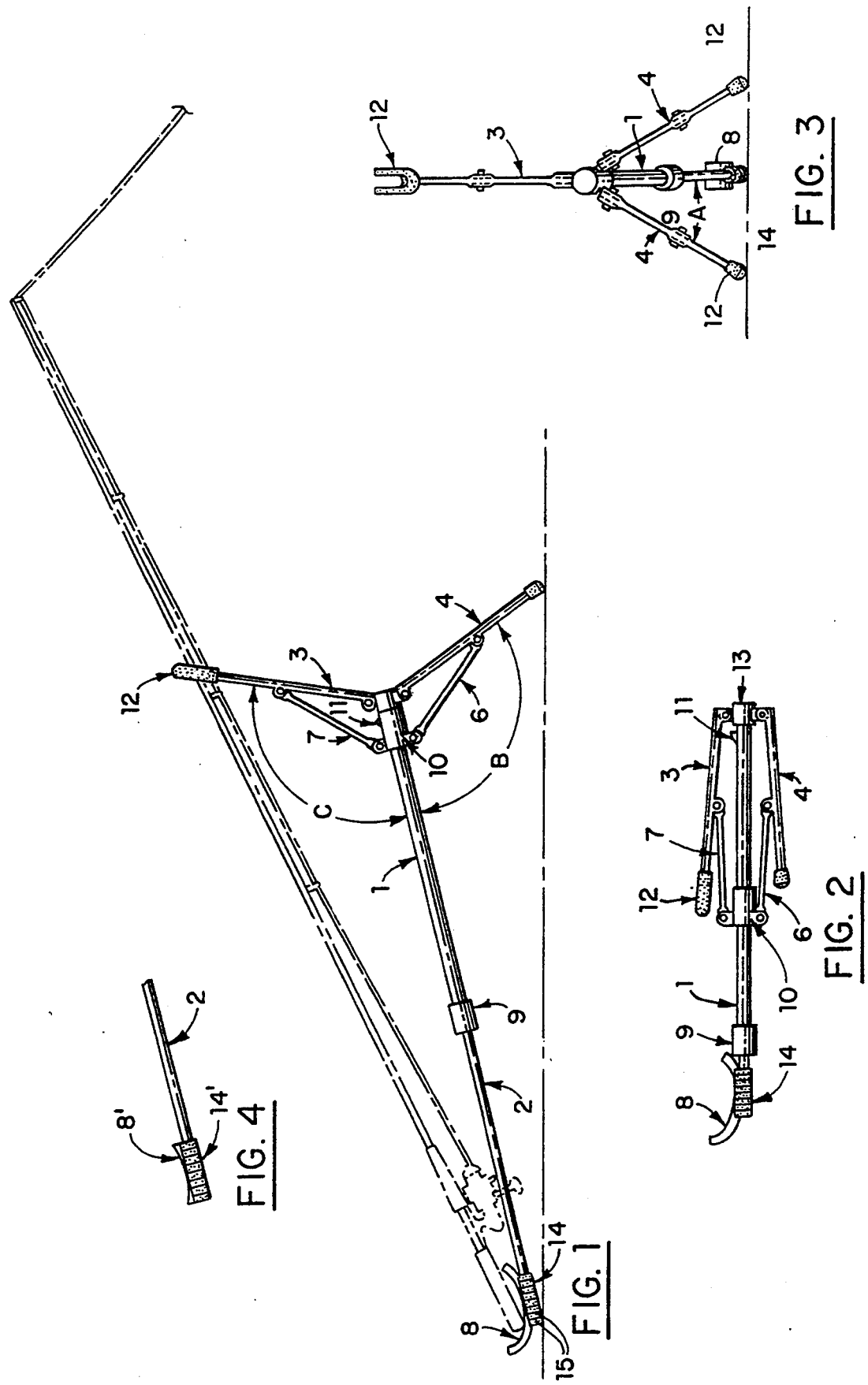

FISHING POLE SUPPORT HOLDER AND METHODS OF CONSTRUCTING AND UTILIZING SAME

BACKGROUND OF THE INVENTION

1. Field of Invention

This invention relates to a fishing pole support holder, and particularly to a collapsible device for supporting a fishing pole in any of a plurality of operable positions.

2. Description of the Relevant Art

There are known inventions that support fishing poles. For example, U.S. Pat. No. 525,132 discloses a fishing pole holder intended to be inserted into the ground, with brackets for holding a plurality of fishing poles. This invention, however, fails to provide a support that can hold a fishing pole in a plurality of operable positions.

In addition, U.S. Pat. No. 4,565,025 discloses a fishing pole holder which includes a helical coil and shank for attachment to a boat surface. The invention is not portable, however, and is capable of holding a fishing pole in only a single operable position.

Further, U.S. Pat. No. 4,650,146 discloses a fishing pole holder that is inserted into the ground and includes a plurality of partially-adjustable tubular members for holding fishing poles. This invention, however, is not collapsible or able to substantially adjust a fishing pole relative to a given surface.

U.S. Pat. No. 4,854,069 discloses a fishing pole holder that includes a clamp and two attachable legs which, along with the fishing pole handle, form a tripod to support the pole in an upright and operable position. Because of the clamping feature, the invention fails to provide a convenient means for adjusting the elevation of the fishing pole.

Still further, U.S. Pat. No. 5,131,179 discloses a fishing pole holder utilizing a tripod mechanism for holding a fishing pole in an operable position, but fails to disclose such a holder with means for conveniently adjusting the elevation of the pole relative to the surface upon which the invention is situated.

SUMMARY OF THE INVENTION

The present invention overcomes the above-discussed limitations and shortcomings of known fishing pole holders and thereby satisfies a significant need for such a holder which is portable for easy transport and storage thereof, and which is capable of quick and easy adjustment of the pole's operable position.

According to the present invention, there is provided a fishing pole support holder that includes a plurality of legs and support means having a plurality of support arms for holding a fishing pole in an upright and operable position; an elongated, tubular base section; means for collapsing the legs by rotating the legs about the base section; and means for telescopically collapsing a support arm relative to the base section.

In use, the collapsing means are first deactivated by rotating the legs and a second support arm away from the base section and in an extended position. Such deactivation consists of extending the legs and support arm until a tab located on the base section engages with a slidable sleeve, which then locks the rotating members of the invention into an operating position. Next, the telescopic collapsing means for a first support arm is deactivated by rotating a locking ring until the arm is easily slidable within the base section, at which point the arm is adjusted to the desired position relative to the base section. Third, the first support arm is locked into position by rotating the locking ring (in the opposite direction as before) until the arm is fast relative to the base section. Finally, the fishing pole is placed on the device and is supported thereby at two points along the pole, so the handle of the pole is held near the ground (or similar surface) and the second end thereof is held in an elevated position relative to the ground (or similar surface). In the event the elevation of the pole requires changing, the first support arm is repositioned relative to the base section until the desired elevation of the fishing pole is obtained.

It is an object of the invention to provide a fishing pole support holder that is capable of holding a fishing pole in a wide range of operating positions.

Another object of the invention is to provide a fishing pole support holder that is quickly and easily adjustable to different operating positions.

Still another object of the invention is to provide a fishing pole support holder that is lightweight and which quickly and easily collapses for efficient storage or transport thereof.

Other objects, advantages and salient features of the present invention will become apparent from the following detailed description, which, when taken in conjunction with the annexed drawings, discloses a preferred embodiment of the present invention.

BRIEF DESCRIPTION OF THE DRAWINGS

FIG. 1 is a side view of a preferred embodiment of the present invention showing the invention in its operational mode and holding a fishing pole.

FIG. 2 is a view of a preferred embodiment of the present invention showing the invention in its collapsed mode.

FIG. 3 is a frontal view of FIG. 1.

FIG. 4 is a modification of one portion of the preferred embodiment of FIG. 1.

DETAILED DESCRIPTION OF THE PREFERRED EMBODIMENT

Referring to FIGS. 1-3, there is shown a fishing pole support holder according to the present invention, including base section 1, legs 4, first and second support arms 2 and 3, respectively, and collapsing assembly 6, 7, 10, 11, 13. The invention is preferably substantially made of a sturdy yet relatively lightweight metal such as an aluminum composite, but it could also be made of other appropriate materials including a nonmetal material such as plastic.

Base section 1 is preferably elongated and substantially tubular, but it could alternatively be shaped having a variety of cross-sections. One end of base section 1 is preferably attached to rotational sleeve 13 and the opposite end thereof is preferably attached to telescoping locking ring 9. Rotational sleeve 13 allows legs 4 and second support arm 3 to each pivotally connect to and rotate about base section 1 so as to collapse substantially against base section 1.

The collapsing assembly includes collapsing sleeve 10, pivot rods 6, 7, and locking tab 11, as shown in FIGS. 1, 2 and 3. Collapsing sleeve 10 preferably substantially surrounds and closely fits on base section 1 so as to be freely slidable therealong. In the event base section 1 is shaped alternatively from its preferred cylindrical nature, sleeve 10 will accordingly be shaped so as to maintain its sliding feature. Additionally, sleeve 10 allows for pivot rods 6, 7 to pivotally connect thereto.

As shown in FIG. 1, pivot rods 6, 7 provide connection between legs 4, second support arm 3 and collapsing sleeve 10. Pivot rods 6 pivotally connect to sleeve 10 and legs 4, while pivot rod 7 pivotally connects to sleeve 10 and second support arm 3. Connections to legs 4 and second support 3 preferably, but not necessarily, are located in a central portion thereon.

The collapsing assembly of the present invention further includes locking tab 11, projecting from base section 1 and depressible therein. Tab 11 is preferably spring-biased, extends from base section 1, and substantially forms a triangle with base section 1 having a right angle located therein, a first side facing rotational sleeve 13 and with the hypotenuse thereof facing collapsing sleeve 10. In such an arrangement, a force applied to the hypotenuse of the triangle causes it to extend substantially within base section 1, while a force applied to the first side thereof fails to do so. Further, collapsing sleeve 10 includes a slot (not shown) situated centrally thereon and linearly in alignment with locking tab 11, the length of which preferably substantially matches the length of tab 11 along base 1 so that tab 11 projects through the slot of sleeve 10 when legs 4 and second support arm 3 are moved into their extended positions.

Legs 4 and second support arm 3 of the present invention are positioned in their extended positions to support a fishing pole, by sliding collapsing sleeve 10 towards rotational sleeve 13, which causes legs 4 and second support arm 3 to rotate about and away from base section 1 due to forces acting on them by rods 6, 7, so as to form obtuse angles B and C with base section 1, respectively, as shown in FIG. 1. Angle B preferably is such as to substantially prevent the holder from tipping over due to rotational forces applied thereto in the plane formed by base 1 and second support arm 3. Locking tab 11 is initially depressed within base 1 when sleeve 10 contacts it. Legs 4 and second support arm 3 reach their extended and operable position to support a fishing pole when the slot located on sleeve 10 is positioned over locking tab 11, causing tab 11 to extend from base 1 and through the slot, thereby locking sleeve 10, legs 4, and second support arm 3 into position.

On the other hand, in order to collapse legs 4 and second support arm 3 for convenient storage or transport of the holder, tab 11 is first depressed so collapsing sleeve 10 is slidable along base 1. Collapsing sleeve 10 is then slid along base 1, which causes legs 4 and second support arm 3 to rotate about base 1 at the corresponding connection points on rotational sleeve 13, due to forces acting on them by rods 6, 7, respectively. Such rotation ceases preferably when legs 4 and second support arm 3 are situated substantially against and in parallel to base 1, as shown in FIG. 2. The length of rods 6, 7 and their connections along legs 4 and second support arm 3, respectively, are preferably such as to accommodate such substantial, collapsible position without excessive sliding action of sleeve 10 and therefore excessive demands on the length of base 1.

As an alternative to the collapsing assembly 6, 7, 10, 11, 13 whereby legs 4 and second support arm 3 all simultaneously collapse, each of legs 4 and support arm 3 could be provided with its own, self-activating collapsing mechanism. For example, such a mechanism could include a pair of pivotally-jointed arms connected between base unit 1 and the corresponding arm or leg, and a locking member for selectively locking the pivot joint between the jointed arms in an operating or extended position. Additionally, such a locking means may include the capability to lock the legs into several operable positions, thus providing a further means for adjusting the elevation of the fishing pole relative to the surface upon which the fishing pole holder is placed.

The preferred embodiment of the present invention preferably includes two leg members 4 which are of equal length. In their extended position, legs 4 combine with first support arm 2 to form a tripod which supports the holder in an upright position, as shown in FIGS. 1 and 3. In such a position, angle A is formed between legs 4 and a vertical plane formed by base 1 and second support arm 3, as shown in FIG. 3. Angle A is preferably of an angle such that the holder is not easily tipped over due to rotational forces applied to the holder and perpendicular to the vertical plane formed by base 1 and second support arm 3.

Legs 4 preferably include caps 12 which accommodate firm engagement with the surface on which the holder is situated. Caps 12 preferably, but not necessarily, are made of a plastic material. Caps 12, as shown in FIGS. 1-3, have a substantially rounded ground-engaging surface, but such surface could alternatively be formed with projections and/or recesses shaped to enhance stable contact with the ground.

Further, legs 4 and second support arm 3 may additionally include a telescoping feature wherein the length of each leg 4 and arm 3 is adjustable. Such a feature accommodates the firm positioning of the holder in an upright position when placed on uneven surfaces. In such an arrangement, the telescopic joint for each arm or leg would be positioned outwardly from the pivot connection to rod 7 or 6, respectively.

Second support arm 3 of the present invention preferably elevates a central section of a fishing pole when the holder is in its extended position and the pole is placed thereon. Arm 3 preferably includes a support means at an end thereof which accommodates such elevation and additionally allows the fishing pole to slide along the means for easy adjustment thereof. As shown in FIG. 3, support arm 3 includes end 12 which is substantially U-shaped. Alternatively, end 12 may be shaped differently and still provide an elevated support and pole-sliding features, such as an end which is substantially O-shaped or V-shaped. When end 12 is V-shaped, the fishing line of a fishing pole desirably extends downwardly further than the fishing pole itself, so that the fishing line is not pressed against end 12 by the pole. Further, end 12 is preferably firmly attached to second arm 3, but it alternatively may be pivotally attached so as to provide increased contact with a fishing pole, depending on the position of first support arm 2.

When the holder is in its operating or extended position, the length of legs 2, second support arm 3, and the angles A, B, and C are such as to elevate a central portion of a fishing pole above the surface on which the holder is situated, for example an elevation of 12" to 18". Alternatively, support arm 3 may additionally include a telescopic feature as discussed above so as to selectively adjust the fishing pole to the desired elevation, preferably in a range that includes, but is not limited to, elevations between 12" and 18".

First support arm 2 of the present invention preferably supports a fishing pole at the pole's handle. The cross section of first support arm 2 preferably substantially matches the cross section of base 1 so arm 2 is telescopically slidable within base 1. Additionally, base 1 includes locking ring 9 preferably attached at an end thereof as shown in FIGS. 1 and 2. By rotating ring 9 in one direction, first support arm 2 is locked firmly in position relative to base 1, while rotating ring 9 in the opposite direction allows arm 2 to be freely slidable within base 1. This sliding feature allows the elevated end of the fishing pole to be set at the desired height by positioning first support arm 2 relative to base 1, regardless of the length of the fishing pole.

Further, first support arm 2 additionally includes a support means 8, attached at its end, for holding the handle of the fishing pole. Preferably such support means cradles the fishing pole handle and prevents it from sliding downwardly, when the holder is in its extended position and the fishing pole is placed thereon. As shown in FIGS. 1 and 2, support means 8 is substantially concave with two prongs extending substantially upwardly. The prong at the outer-most end of support means 8 is preferably longer than the other prong so the handle of the fishing pole is prevented from sliding downwardly due to gravitational forces acting on the pole.

Alternatively, support means 8 may be shaped differently and still effectively hold the fishing pole handle in position. For example, support means 8 could be substantially spherical with an opening facing base 1.

As shown in FIGS. 1-3, support means 8 is preferably disposed on a member 14 which dually functions as a ground-engaging member for first support arm 2 when the holder is being used to support a fishing pole, and as a handle for carrying and transporting the holder. Member 14 is preferably formed from a relatively soft, easy to grip material such as foam rubber and includes hand grips 15 formed into the surface thereof. Most preferably, support means 8 will be formed integrally with member 14 and will not excessively project therefrom so as to interfere with the carrying and transporting function of member 14. A second support arm including a modified member 14' and support means 8' is shown in FIG. 4. The modified support means 8' is more compact than the support means 8, and is formed integrally into member 14'.

When the holder is used to hold a fishing pole, first support arm 2 and member 14 is adapted to cooperate with legs 4 to form a tripod, when legs 4 are in their extended positions.

In use, legs 4 and second support arm 3 are placed in their extended positions by sliding collapsing sleeve 10 towards rotational sleeve 13, until locking tab 11 engages with the slot located on collapsing sleeve 10. Next, locking ring 9 is rotated so as to allow first support arm 2 to freely slide partially within base 1 into its desired position. Locking ring 9 is then rotated in the opposite direction until first support arm 2 is firmly locked into position relative to base 1. Finally, a fishing pole is placed on support arms 2 and 3 so the handle thereof is cradled in support means 8 and a central portion thereof rests on U-shaped second support arm 3. Additionally, in the event the elevation of the fishing pole requires further adjustment, the position of first support arm 2 is readjusted relative to base 1, using locking ring 9 accordingly.

Although there have been described what is at present considered to be the preferred embodiment of the present invention, it will be understood that the invention can be embodied in other specific forms without departing form the spirit or essential characteristics thereof.

For example, the fishing pole holder may be modified to support a plurality of poles simultaneously, such as by modifying end 12 of second support arm 3 to be substantially U-shaped with tabs for separating each of several poles supported thereon; or by providing a plurality of second support arms 3, each situated proximally to each other and connected to the collapsing assembly of the present invention.

The described embodiment is, therefore, to be considered in all aspects as illustrative, and not restrictive. The scope of the invention is indicated by the appended claims rather than the foregoing description.

I claim:

1. A fishing pole holder, comprising:
   an elongated base;
   a plurality of legs connected to said base;
   means, connected to said base, for supporting a fishing pole in a plurality of selectively-adjustable operating positions;
   means for collapsing said legs and support means substantially against said base;
   said support means is adapted to support said fishing pole at a plurality of locations therealong, and including a first support arm and a second support arm;
   said collapsing means being attached to said legs and support means;
   said collapsing means including means for rotating said legs and said second support arm towards and substantially in parallel to said base upon activation thereof; and
   said collapsing means rotates said legs and said second support arm substantially simultaneously.

2. A fishing pole holder as recited in claim 1, wherein:
   each of said legs and said second support arm is pivotally connected at one end thereof to said base.

3. A fishing pole holder as recited in claim 1, wherein:
   said second support arm includes a support end adapted to selectively support said fishing pole at any of numerous portions of an intermediate section thereof.

4. A fishing pole holder as recited in claim 3, wherein:
   said support end is substantially U-shaped so as to accommodate sliding of said fishing pole therein.

5. A fishing pole holder as recited in claim 1, wherein:
   said first support arm includes an end for supporting a handle of said fishing pole.

6. A fishing pole holder as recited in claim 5, wherein:
   said end of said first support arm is concave.

7. A fishing pole holder as recited in claim 1, wherein:
   said first support arm is substantially elongated and is adapted to telescopically slide relative to said base for adjusting a length thereof.

8. A fishing pole holder as recited in claim 7, wherein:
   said elongated base includes a bore located axially therein and shaped to slidably accommodate said first support arm therein.

9. A fishing pole holder as recited in claim 8, wherein:
   said support means further includes means for selectively locking said first support arm into position within said base.

10. A fishing pole holder as recited in claim 9, wherein:
    said locking means includes a sleeve connected at an end of said base and rotatable about a longitudinal axis of said base said sleeve locks said first support arm into position relative to said base upon rotation thereof.

11. A fishing pole holder as recited in claim 1, wherein:
said first support arm, together with said legs, supports the holder in a standing position.

12. A fishing pole holder, comprising:
an elongated base;
a plurality of legs connected to said base;
means, connected to said base, for supporting a fishing pole in a plurality of selectively-adjustable operating positions;
means for collapsing said legs and support means substantially against said base;
said support means is adapted to support said fishing pole at a plurality of locations therealong, and including a first support arm and a second support arm;
said collapsing means being attached to said legs and support means;
said collapsing means including means for rotating said legs and said second support arm towards and substantially in parallel to said base upon activation thereof;
each of said legs and said second support arm is pivotally connected at one end thereof to said base; and
said rotating means includes a sleeve attached to and slidable along said base.

13. A fishing pole holder as recited in claim 12, wherein:
said rotating means includes a plurality of pivot rods connecting said legs and said second support arm to said sleeve.

14. A fishing pole holder as recited in claim 13, wherein:
said pivot rods are pivotally connected to said legs, said second support arm, and said sleeve.

15. A collapsible fishing pole supporting device, comprising:
an elongated base member;
a plurality of first support members adjustably connected to said base member and adapted to support said member above a given surface;
a plurality of second support members adjustably connected to said base member and adapted to selectively support a fishing pole in any of numerous positions above said base member;
means for collapsing said first and second support members substantially against said base member; and
said collapsing means including means for simultaneously rotating said first support members towards said base member upon activation thereof.

* * * * *